United States Patent
Fukasawa

(10) Patent No.: US 8,264,743 B2
(45) Date of Patent: Sep. 11, 2012

(54) INFORMATION PROCESSOR, INFORMATION PROCESSING METHOD, AND RECORDING MEDIUM

(75) Inventor: Naoki Fukasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 785 days.

(21) Appl. No.: 12/417,889

(22) Filed: Apr. 3, 2009

(65) Prior Publication Data
US 2009/0251728 A1    Oct. 8, 2009

(30) Foreign Application Priority Data

Apr. 8, 2008 (JP) .................................. 2008-100512
Feb. 19, 2009 (JP) .................................. 2009-037032

(51) Int. Cl.
*G06F 15/00* (2006.01)
*G06F 3/12* (2006.01)

(52) U.S. Cl. ........................ 358/1.9; 358/1.6; 358/1.13

(58) Field of Classification Search ................ 358/1.15, 358/1.9; 709/220; 707/104.1
See application file for complete search history.

(56) References Cited

U.S. PATENT DOCUMENTS

| | | | |
|---|---|---|---|
| 6,614,550 B1 | 9/2003 | Minagawa | |
| 7,855,799 B2* | 12/2010 | Shah | 358/1.15 |
| 2002/0080376 A1 | 6/2002 | Momose et al. | |
| 2004/0102687 A1* | 5/2004 | Brashears et al. | 600/323 |
| 2005/0099645 A1 | 5/2005 | Saito et al. | |
| 2006/0262338 A1 | 11/2006 | Momose et al. | |
| 2006/0279783 A1* | 12/2006 | Kato | 358/1.18 |
| 2008/0259390 A1* | 10/2008 | Murase | 358/1.15 |
| 2008/0270469 A1* | 10/2008 | Myerson et al. | 707/104.1 |
| 2009/0128838 A1* | 5/2009 | Yamamoto | 358/1.9 |
| 2010/0076948 A1* | 3/2010 | Smithson et al. | 707/706 |
| 2011/0131300 A9* | 6/2011 | Akiyama et al. | 709/220 |

FOREIGN PATENT DOCUMENTS

JP    2003-280841    10/2003
JP    3943829    7/2007

OTHER PUBLICATIONS

Extended European Search Report.

* cited by examiner

*Primary Examiner* — Jerome Grant, II
(74) *Attorney, Agent, or Firm* — IPUSA, PLLC

(57) ABSTRACT

An information processor includes a display part displaying a configuration pattern combining values set for corresponding two or more of printing conditions; a management part managing default values for the printing conditions for an image forming apparatus; a recording part recording the configuration pattern and optionally setting an identifier as a value for the individual printing conditions, the identifier being indicative of the individual default values; and a setting part, in response to the identifier being set for at least one of the two or more of the printing conditions in the recorded configuration pattern, obtaining one of the default values corresponding to the at least one of the two or more of the printing conditions from the management part and setting the obtained one of the default values for the at least one of the two or more of the printing conditions in the configuration pattern.

6 Claims, 24 Drawing Sheets

FIG.7

```
<!-- config_patterns.xml -->
<config_patterns>
  <features>
    <feature name = "Duplex"/>
    <feature name = "Layout"/>
    <feature name = "Staple"/>
    <feature name = "Punch"/>
    <feature name = "Papersize"/>
  </features>
  <patterns>
    <pattern filename = "pattern01.xml"/>
    <pattern filename = "pattern02.xml"/>
  </patterns>
</config_patterns>
```

FIG.8

```
<!-- pattern01.xml -->
<config_pattern>

<pattern_name>Pattern 01</pattern_name>

<settings>
    <feature name = "Duplex" value = "ON"/>
    <feature name = "Layout" value = "@default"/>
    <feature name = "Staple" value = "Topleft"/>
    <feature name = "Punch" value = "@default"/>
    <feature name = "Papersize" value = "@default"/>
</settings>

</config_pattern>
```

FIG.9

```
<!-- pattern02.xml -->
<config_pattern>

<pattern_name>Pattern 02</pattern_name>

<settings>
  <feature name = "Duplex" value = "@default"/>
  <feature name = "Layout" value = "2in1"/>
  <feature name = "Staple" value = "@default"/>
  <feature name = "Punch" value = "Left"/>
  <feature name = "Papersize" value = "@default"/>
</settings>

</config_pattern>
```

FIG.10

| Printer01 | |
|---|---|
| FUNCTION NAME (PRINTING CONDITION) | DEFAULT VALUE |
| Duplex | ON |
| Layout | 2 in 1 |
| Staple | Top Left |
| Punch | Left |
| Paper Size | A4 |

| Printer02 | |
|---|---|
| FUNCTION NAME (PRINTING CONDITION) | DEFAULT VALUE |
| Duplex | OFF |
| Layout | 1 |
| Staple | OFF |
| Punch | OFF |
| Paper Size | A4 |

```
<!-- pattern01.xml -->
<config_pattern>

<pattern_name>Pattern 01</pattern_name>
<settings>
    <feature name = "Duplex" value = "ON"/>
    <feature name = "Staple" value = "Left"/>
</settings>

<config_pattern>
```

FIG.16

```
<!-- pattern02.xml -->
<config_pattern>

<pattern_name>Pattern 02</pattern_name>
<settings>
    <feature name = "Layout" value = "2in1"/>
    <feature name = "Punch" value = "ON"/>
</settings>

<config_pattern>
```

FIG.21

```
<!-- pattern03xml -->
<config_pattern>

<pattern_name>Pattern 03</pattern_name>
<settings>
  <feature name = "Staple" value = "@default"/>
  <feature name = "Punch" value = "right"/>
</settings>

</config_pattern>
```

INFORMATION PROCESSOR, INFORMATION PROCESSING METHOD, AND RECORDING MEDIUM

BACKGROUND OF THE INVENTION

1. Field of the Invention

The present invention relates to an information processor, an information processing method, and a recording medium.

2. Description of the Related Art

A recent increase in the number of printer functions has made it complicated to set up printing conditions in image forming apparatuses with printer functions. Naturally, this results in an increase in the number of configuration items of the user interface (UI) of a printer driver representing printer functions, thus requiring complicated operations on the user side.

However, normal users do not use so wide a variety of printer functions, and often end up in using a limited number of combinations of printing conditions, such as "DUPLEX AND COMBINE" and "DUPLEX AND STAPLE." There has been proposed a technique using such combinations of printing conditions.

For example, Japanese Laid-Open Patent No. 2003-280841 (Patent Document 1) describes configuring all printing and processing functions necessary for a user and storing the configured functions as a single object.

For example, Japanese Patent No. 3943829 (Patent Document 2) describes storing the printing conditions set up by a user by correlating the printing conditions with a single-click icon.

However, the techniques of Patent Documents 1 and 2 described above, which assume that the printer driver is connected to a single type of printer, have a problem in that some printing conditions in a stored combination may not be available depending on the specifications of a printer in the case of connecting the printer driver to multiple types of printers.

SUMMARY OF THE INVENTION

According to an aspect of the present invention, an information processor and an information processing method are provided in which the above-described problem may be solved or reduced.

According to an aspect of the present invention, an information processor and an information processing method are provided that, in an environment where multiple types of printers are connected, can set up a combination of printing conditions that can be shared by the printers.

According to one embodiment of the present invention, an information processor includes a display part configured to display a configuration pattern combining a plurality of values set for corresponding two or more of printing conditions; a management part configured to manage a plurality of default values for the printing conditions for an image forming apparatus; a recording part configured to record the configuration pattern, the recording part being configured to optionally set an identifier as a value for the individual printing conditions, the identifier being indicative of the individual default values; and a setting part configured to, in response to the identifier being set for at least one of the two or more of the printing conditions in the configuration pattern recorded by the recording part, obtain one of the default values corresponding to the at least one of the two or more of the printing conditions from the management part and set the obtained one of the default values for the at least one of the two or more of the printing conditions in the configuration pattern.

According to one embodiment of the present invention, an information processing method includes the steps of (a) displaying a configuration pattern combining a plurality of values set for a plurality of printing conditions; (b) recording the configuration pattern; (c) determining, with respect to each of the printing conditions in the recorded configuration pattern, whether an identifier indicating a default value for the printing condition is set for the printing condition; and (d) obtaining the default value from a storage part and setting the default value for the printing condition in response to step (c) determining that the identifier indicating the default value for the printing condition is set for the printing condition.

According to one embodiment of the present invention, a computer-readable recording medium has a program for causing a computer to execute the information processing method as set forth above.

BRIEF DESCRIPTION OF THE DRAWINGS

Other objects, features and advantages of the present invention will become more apparent from the following detailed description when read in conjunction with the accompanying drawings, in which:

FIG. 7 is a diagram illustrating a description of the root of user configuration pattern information according to the first embodiment of the present invention;

FIG. 8 is a diagram illustrating a description of the user configuration pattern in XML according to the first embodiment of the present invention;

FIG. 9 is a diagram illustrating a description of the user configuration pattern in XML according to the first embodiment of the present invention;

FIG. 10 illustrates tables containing the printing conditions and default values of corresponding image forming apparatuses according to the first embodiment of the present invention;

FIG. 15 is a diagram illustrating a description of the user configuration pattern according to a second embodiment of the present invention;

FIG. 16 is a diagram illustrating a description of the user configuration pattern according to a second embodiment of the present invention;

FIG. 21 is a diagram for illustrating a fourth embodiment of the present invention, showing a user configuration pattern that provides incompatible settings simultaneously;

DETAILED DESCRIPTION OF THE PREFERRED EMBODIMENTS

A description is given below, with reference to the accompanying drawings, of embodiments of the present invention.

First Embodiment

Figure 1:
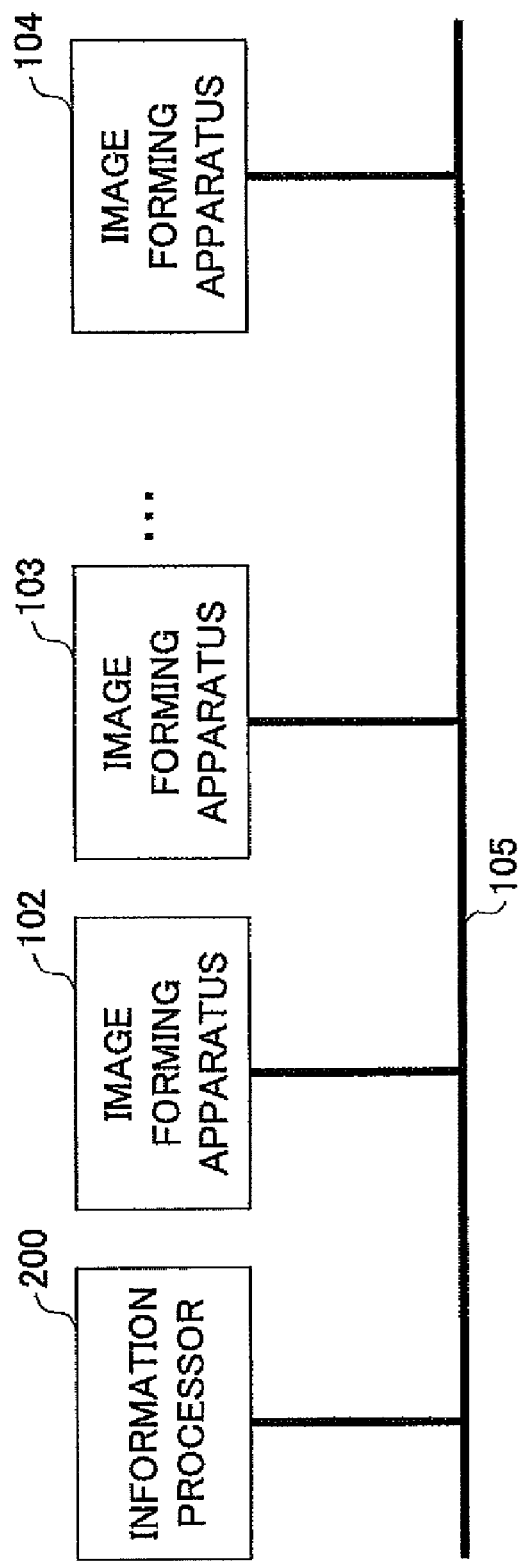
FIG. 1 is a diagram illustrating a configuration according to a first embodiment of the present invention.

FIG. 1 is a diagram illustrating a configuration according to a first embodiment of the present invention. Referring to FIG. 1, an information processor 200 such as a personal computer (PC) is connected to multiple image forming apparatuses 102 through 104 such as printers or multifunction peripherals (MFPs) via a network 105 such as a local area network (LAN) or a wide area network (WAN). This embodiment assumes usage of a common printer driver available for multiple image forming apparatuses (hereinafter also referred to as "universal driver") in such an environment.

[Hardware Configuration of Information Processor]

Figure 2:
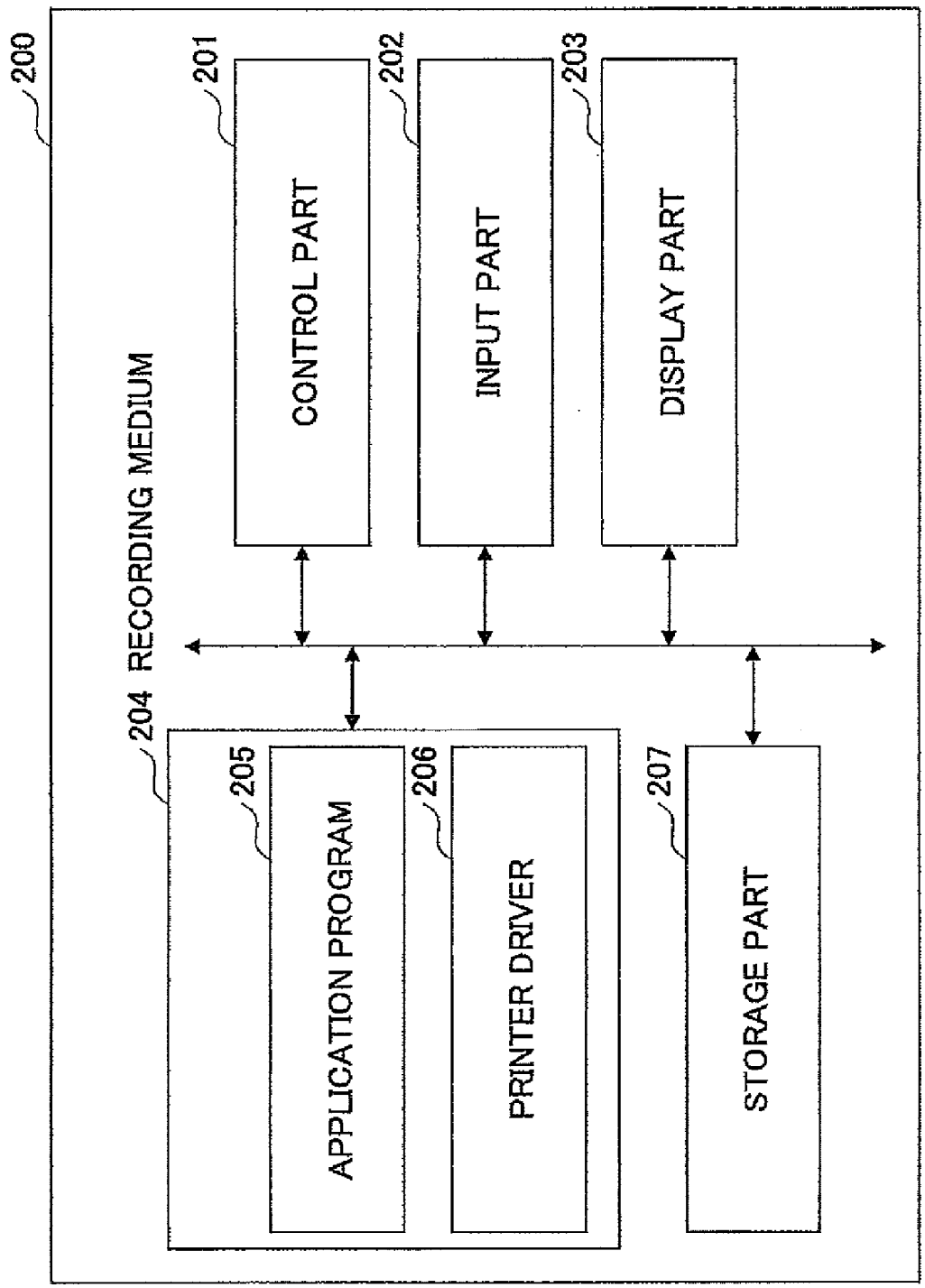
FIG. 2 is a block diagram illustrating a schematic hardware configuration of an information processor according to the first embodiment of the present invention.

FIG. 2 is a block diagram illustrating a schematic hardware configuration of the information processor 200 according to the first embodiment. The information processor 200 includes a control part 201, an input part 202, a display part 203, a recording medium 204, and a storage part 207.

The control part 201 is a processor that controls various apparatuses and performs data operations and processing in a computer, such as a central processing unit (CPU). The control part 201 executes programs contained in the storage part 207. The control part 201 receives data from an input device or a storage unit, performs operations and processing on the received data, and outputs the data to an output device or the storage unit.

Each of the input part 202 and the display part 203, which may include key switches (hard keys) and/or a liquid crystal display (LCD) having a touch panel function (including the software keys of a graphical user interface [GUI]), is a display and/or input unit that serves as a UI in using the functions of the information processor 200.

The recording medium 204 contains one or more application programs 205 (hereinafter collectively referred to as "application program 205") and a printer driver 206. Examples of the recording medium 204 include optical, magnetic, or electric recording media such as hard disks. The application program 205 and the printer driver 206 may be read from the recording medium 204 into a memory such as a RAM (not graphically illustrated) and executed.

The application program 205, which implements the basic functions of personal computers, performs processing such as document creation and spreadsheet calculation.

The printer driver 206 controls a printer (an example of the image forming apparatuses 102 through 104 of FIG. 1) in order to perform printing in accordance with a print instruction of the application program 205. Further, the information processor 200 can display the printing conditions of the printer on a display screen in the display part 203 and change one or more of the printing conditions to those desired by a user by using the printer driver 206.

The storage part 207 contains a combination of printing conditions set up by each user. A combination of printing conditions is hereinafter referred to as a "configuration pattern." In particular, a combination of printing conditions set up by a user is referred to as a "user configuration pattern." Examples of the storage part 207 include hard disks.

The user configuration pattern is contained in a local folder of Windows (registered trademark). Further, a user can refer to or change the user's user configuration pattern by suitably accessing it.

The user configuration pattern is contained in a local folder because the DEVMODE structure is insufficient in size and the registry is not accessible with user authority.

Figure 3:
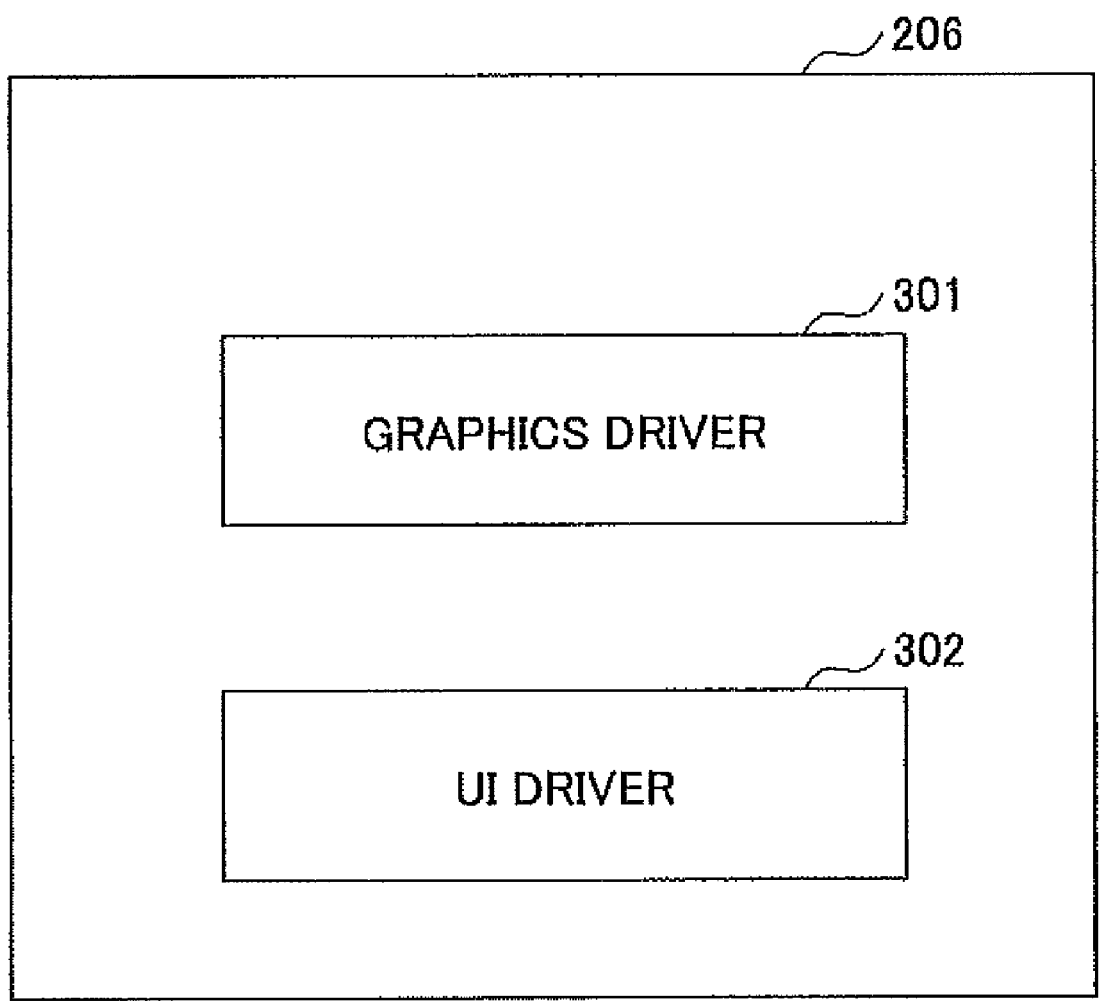
FIG. 3 is a block diagram illustrating a schematic internal configuration of a printer driver according to the first embodiment of the present invention.

Next, a description is given, with reference to FIG. 3, of the printer driver 206. FIG. 3 is a block diagram illustrating a schematic internal configuration of the printer driver 206. The printer driver 206 includes a graphics driver 301 and a UI driver 302. The graphics driver 301 controls the method of displaying graphics such as pictures and video on the display screen.

The UI driver 302 controls the form of displaying information to a user and the method of entering data by a user. Next, a detailed description is given, with reference to FIG. 4, of the UI driver 302 according to the first embodiment.

Figure 4:
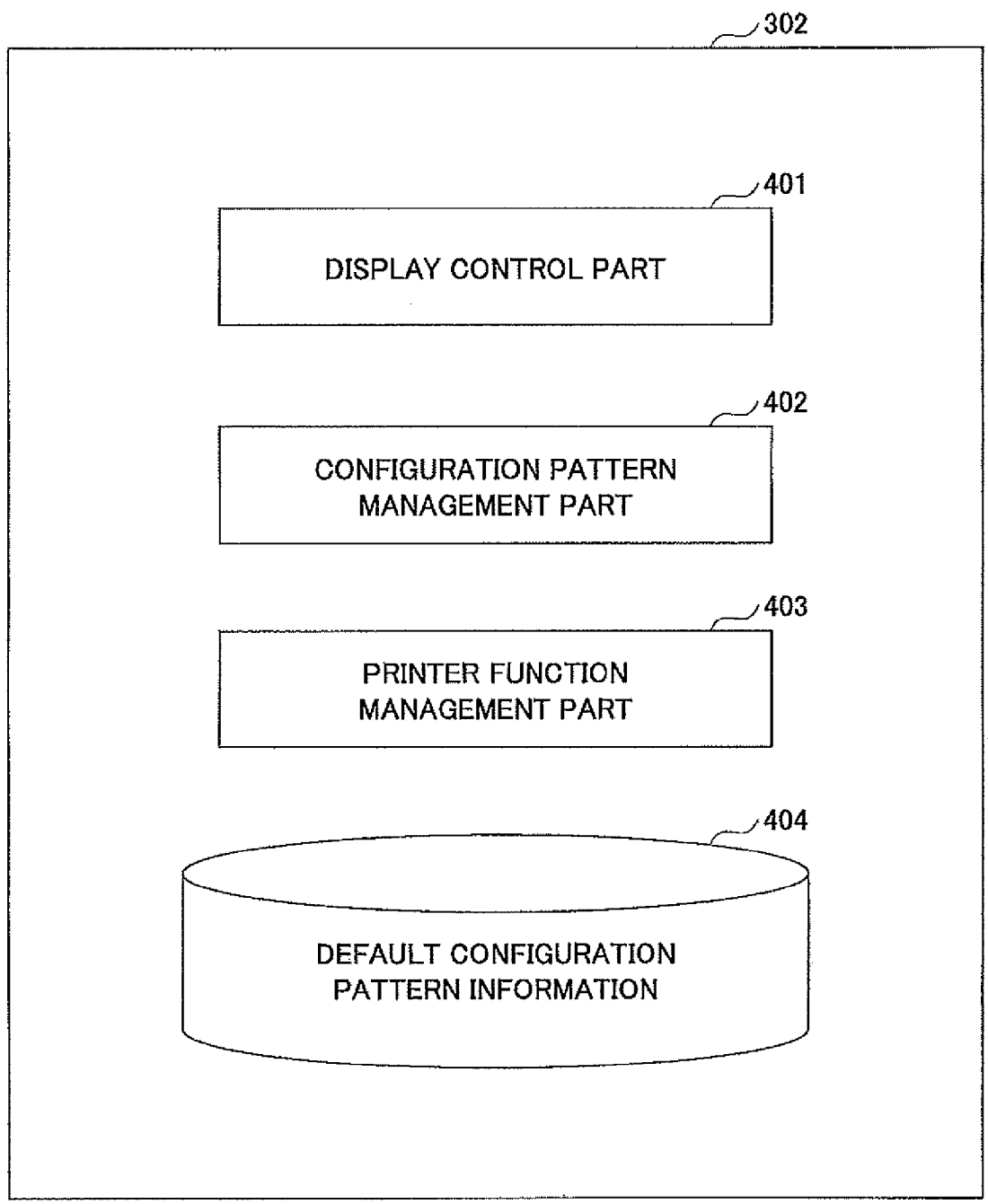
FIG. 4 is a block diagram illustrating a schematic internal configuration of an UI driver according to the first embodiment of the present invention.

FIG. 4 is a block diagram illustrating a schematic internal configuration of the UI driver 302 according to the first embodiment. The UI driver 302 includes a display control part 401, a configuration pattern management part 402, a printer function management part 403, and default configuration pattern information 404.

The display control part 401 controls displaying currently set-up printing conditions to a user and controls the changing of a printing condition setting by a user. Further, the display control part 401 makes it possible to perform displaying for causing a user configuration pattern to be selected from multiple user configuration patterns and to perform displaying for causing multiple printing conditions to be combined and recorded as a user configuration pattern.

The configuration pattern management part 402 reads the settings (set values) of the printing conditions of a user configuration pattern selected by a user through the display part 203 from the user configuration pattern contained in the storage part 207, and sets the read settings as the values of the printing conditions of an image forming apparatus to be used.

Further, the configuration pattern management part 402 changes the contents of the printing conditions of the user configuration pattern contained in the storage part 207 in response to the user's changing the contents of the printing conditions of the user configuration pattern displayed on the display part 203.

If no user configuration pattern is contained in the storage part 207, the configuration pattern management part 402 stores a default configuration pattern contained in the UT driver 302 (the default configuration pattern information 404) in the storage part 207, thereby setting the default configuration pattern as a user configuration pattern. The default configuration pattern cannot be changed.

The printer function management part 403 manages the functional specifications and performance of an image forming apparatus. The printer function management part 403 performs data communications with image forming apparatuses and servers, and updates their functional specifications or performance.

Further, the printer function management part 403 obtains the default settings (default values) of the printing conditions of image forming apparatuses. The printer function management part 403 determines whether the settings of the printing conditions of a user configuration pattern can be used for an image forming apparatus to be used.

The default configuration pattern information 404 is information on default configuration patterns contained in the installation package of the printer driver 206. Usually, multiple configuration patterns are contained.

[Functional Configuration of Information Processor]

Figure 5:
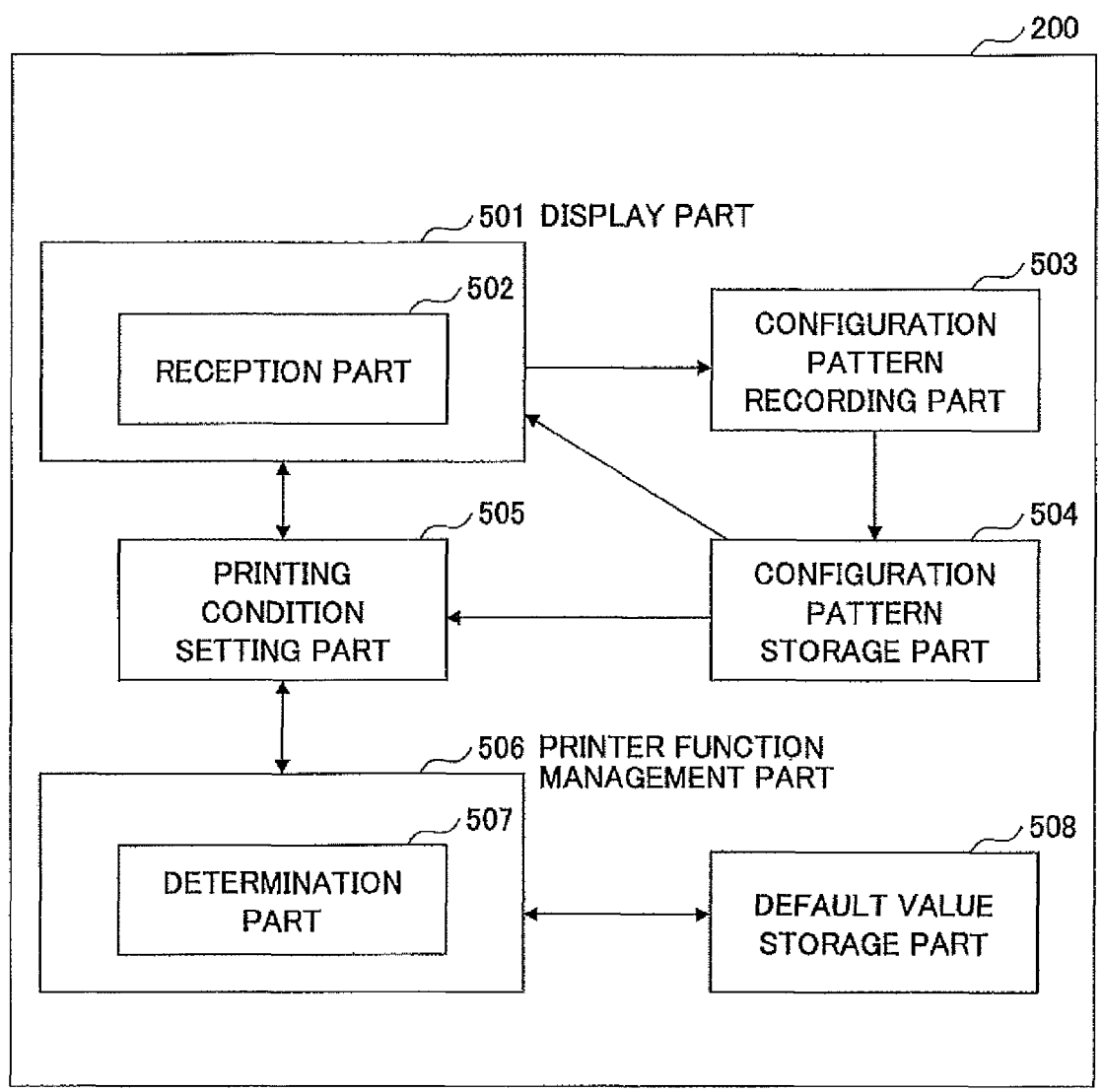
FIG. 5 is a block diagram illustrating a functional configuration of the information processor according to the first embodiment of the present invention.

FIG. 5 is a block diagram illustrating a functional configuration of the information processor 200 according to the first embodiment. The information processor 200 includes a display part 501, a configuration pattern recording part 503, a configuration pattern storage part 504, a printing condition setting part 505, a printer function management part 506, and a default setting storage part 508. conditions of an image forming apparatus to be used, The display part 501 displays the printing and displays a user configuration pattern contained in the configuration pattern storage part 504.

The display part 501 includes a reception part 502. The reception part 502 receives a setting change of printing conditions. Further, in response to a user's instruction to record a configuration pattern, the reception part 502 outputs the contents of the configuration pattern to be recorded to the configuration pattern recording part 503. If the user's instruction is not "recording a configuration pattern," the reception part 502 outputs the contents of a change in the printing conditions to the printing condition setting part 505.

The configuration pattern recording part 503 records a user-desired combination of printing conditions received by the reception part 502 in the configuration pattern storage part 504 as a user configuration pattern, along with a name or identifier that identifies the user configuration pattern.

Figure 6:
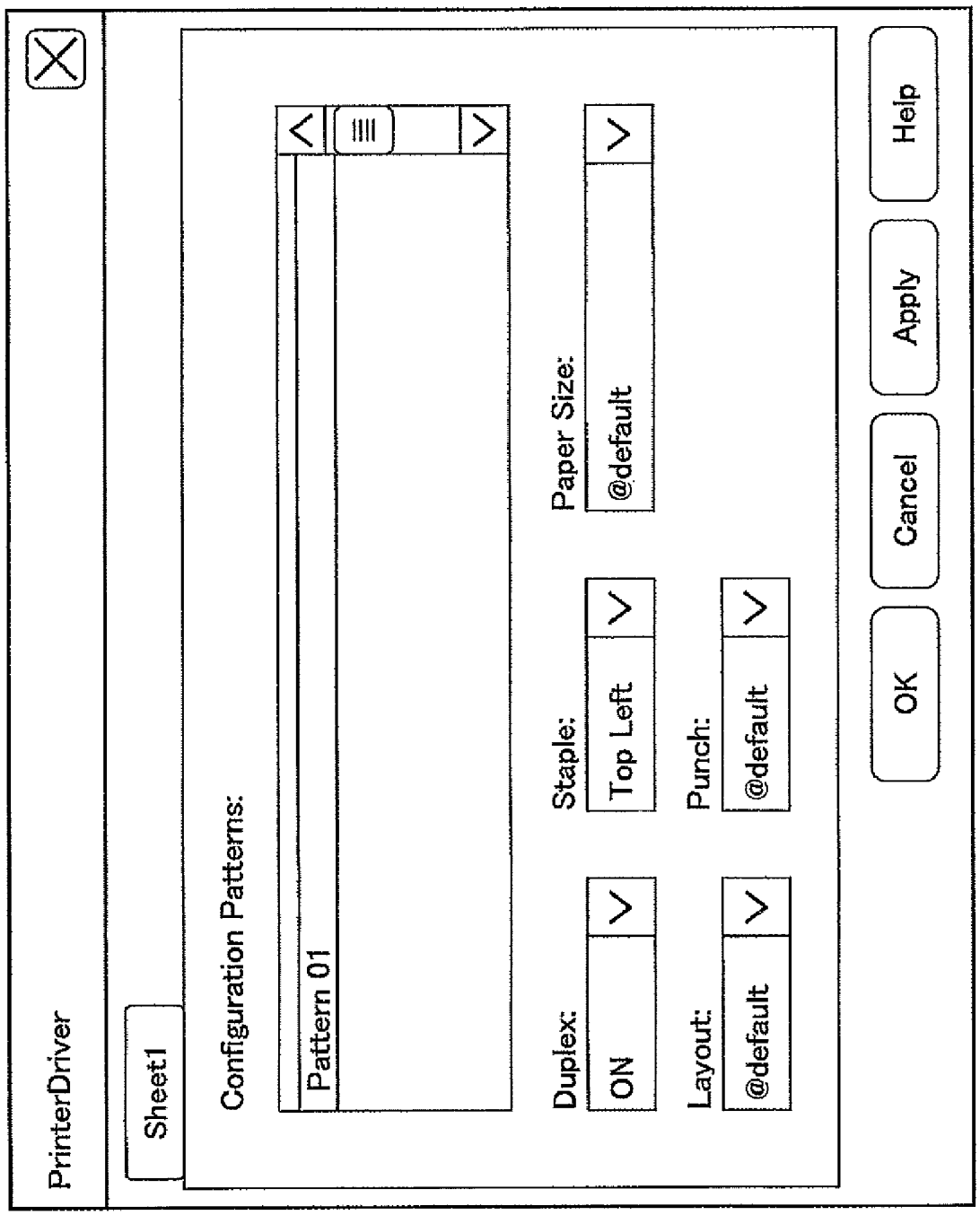
FIG. 6 is a diagram illustrating a display screen in recording a user configuration pattern according to the first embodiment of the present invention.

Here, a description is given, with reference to FIG. 6, of recording a user configuration pattern. FIG. 6 is a diagram illustrating a display screen in recording a user configuration pattern. In the case illustrated in FIG. 6, (values for) five printing conditions of "Duplex," "Staple," "Paper Size," "Layout," and "Punch" are recorded as a configuration pattern.

In the case of FIG. 6, it is assumed that the settings of "Duplex: ON," "Staple: Top Left," "Paper Size: @default," "Layout: @default," and "Punch: @default" are provided, for example, selected or specified from corresponding pull-down menus, and these conditions are recorded as a user configuration pattern named "Pattern 01."

Here, "@default" is an identifier that indicates setting, for a printing condition for which "@default" is set, the default value of an image forming apparatus to be used for the printing condition. The description is not limited to this as long as the description can indicate setting a default value.

Here, it is possible to set a default value by specifically setting "@default" for a printing condition. On the other hand, a default value may be automatically recorded in a configuration pattern if the pull-down menu of the printing condition is not clicked. This is because a user's not clicking the pull-down menu of a printing condition means that the user does not check the conditions (options) of the printing condition, and can accordingly be presumed unimportant to the user.

Referring back to FIG. 5, the configuration pattern storage part 504 stores a user configuration pattern requested by the configuration pattern recording part 503 to be recorded. The recorded user configuration pattern is read into the display part 501 at the time of providing an initial configuration pattern setup (FIG. 11) or read into the printing condition setting part 505 at the time of setting up printing conditions.

Here, a description is given, with reference to FIG. 7, of describing the entire configuration of user configuration patterns in XML. A default configuration pattern is also described in the same format. Here, user configuration patterns are described in XML, but other formats such as YAML and JSON may also be used.

FIG. 7 is a diagram illustrating describing the root of user configuration pattern information. In "config_patterns.xml," the entire configuration of user configuration patterns is described. A list of functions (synonymous with printing conditions) to which the user configuration patterns are directed is described between "features" tags.

Here, "Duplex," "Staple," "Paper Size," "Layout," and "Punch" are described as printing conditions necessary for printing. These printing conditions may be subjected to a setting change in a suitable manner.

A list of the file names of the user configuration patterns is described between "patterns" tags. Here, "pattern01.xml" and "pattern02.xml" are described.

Next, a description is given, with reference to FIG. 8 and FIG. 9, of describing a user configuration pattern in XML. FIG. 8 is a diagram illustrating a description of "pattern01.xml." In "pattern01.xml," an individual configuration pattern can be described. A name given to the configuration pattern is described between "pattern_name" tags. Here, the configuration pattern is named "Pattern 01."

The settings (set values) of the printing conditions described between the "features" tags of "config_patterns.xml" are described between "settings" tag. Here, if the setting of a printing condition is "@default," this means to follow the default value of a printing condition in an image forming apparatus to be used, which printing condition corresponds to the printing condition for which "@default" is set.

In "Pattern 01" illustrated in FIG. 8, the same printing conditions of "Layout," "Punch," and "Paper Size" are set to "@default" as in the case illustrated in FIG. 6. Therefore, with respect to these printing conditions, printing is performed in accordance with their corresponding default values in the image forming apparatus to be used. Likewise, in "Pattern 02" illustrated in FIG. 9, the printing conditions of "Duplex," "Staple," and "Paper Size" are set to "@default," so that with respect to these printing conditions, printing is performed in accordance with their corresponding default values in the image forming apparatus to be used.

Referring back to FIG. 5, if the user configuration pattern obtained from the configuration pattern storage part 504 includes a printing condition for which "@default" is set, the printing condition setting part 505 obtains the default value of the printing condition in the image forming apparatus to be used from the printer function management part 506, and sets the obtained default value for the printing condition.

At this point, the printing condition setting part 505 identifies the image forming apparatus to be used by using the identifier of the image forming apparatus obtained through the display part 501, and obtains the default value of the printing condition in the identified image forming apparatus from the printer function management part 506.

The printer function management part 506 obtains the default values of printing conditions from the default value storage part 508, and outputs the default value of the printing condition in an image forming apparatus requested by the printing condition setting part 505 to the printing condition setting part 505.

The default value storage part 508 may not necessarily be provided in the information processor 200, and may be provided in the image forming apparatus. In this case, the printer function management part 506 may be configured to establish connection to the image forming apparatus through a network, and may obtain default values from the image forming apparatus every time the printer function management part 506 connects to the image forming apparatus.

Further, the printer function management part 506 includes a determination part 507. The determination part 507 determines whether the setting of (the value set for) a printing condition of a user configuration pattern is settable in image forming apparatuses.

This determination as to settability is made by determining whether the setting of the printing condition is provided as a printer function of the image forming apparatus. That is, even if the setting of printing condition "Duplex" of a user configuration pattern is "ON," the setting "ON" is determined as unsettable unless the image forming apparatus to be used includes a duplex unit (for duplex printing).

The default value storage part 508 stores the default values of the printing conditions of image forming apparatuses. A description is given, with reference to FIG. 10, of the case where the default value storage part 508 is provided in the information processor 200. FIG. 10 illustrates tables containing the printing conditions and default values of corresponding image forming apparatuses. As illustrated in FIG. 10, the printing conditions and default values are contained so that the default values can be uniquely identified from the name of the image forming apparatus and a function name (printing condition).

The printer function management part 506 may store the tables illustrated in FIG. 10 in the default value storage part 508 by obtaining default values in advance or at a certain time by connecting to the corresponding image forming apparatuses through a network.

If the default value storage part 508 is provided in image forming apparatuses, their respective default values may be stored in such a data structure as illustrated in FIG. 10.

[Initial Configuration Pattern Setup in First Embodiment]

Figure 11:
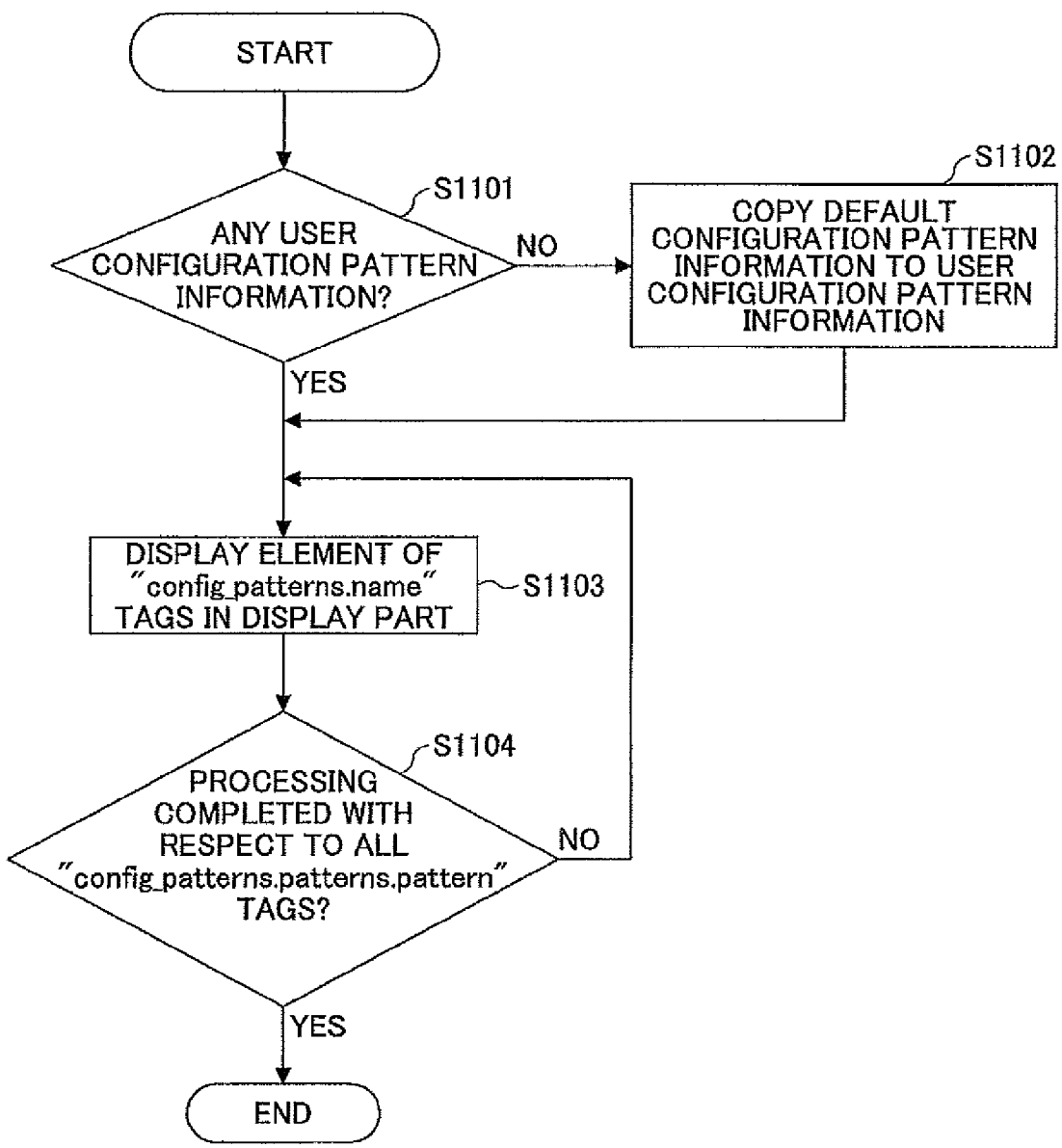
FIG. 11 is a flowchart for illustrating provision of an initial configuration pattern setup according to the first embodiment of the present invention.

A description is given, with reference to FIG. 11, as well as FIG. 4 and FIG. 5, of providing an initial configuration pattern setup. FIG. 11 is a flowchart for illustrating the provision of an initial configuration pattern setup according to the first embodiment. In the case illustrated in FIG. 11, the name of a user configuration pattern contained in the configuration pattern storage part 504 is displayed in the display part 501.

In step S1101, the printing condition setting part 505 (configuration pattern management part 402) determines whether there is a user configuration pattern configured (set up) by a user in a Windows (registered trademark) local folder (configuration pattern storage part 504).

The local folder may be obtained by obtaining a path changeable with user authority using a function such as SHGetSpecialFolderPath and thereafter generating a character string unique to a printer driver or an image forming apparatus and connecting the generated character string to the obtained path.

If the determination result of step S1101 is NO, in step S1102, the printing condition setting part 505 (configuration pattern management part 402) reads the default configuration pattern information 404 and stores it in (copies it to) the local folder as a user configuration pattern.

The default configuration pattern information 404 is also included in the installation package of the printer driver 206 (FIG. 2), and is copied to the installation folder of the printer driver 206 at the time of its installation.

If the determination result of step S1101 is YES or if the processing of step S1102 ends, in step S110, the display control part 401 reads "config_patterns.xml" of the user configuration pattern information contained in the Windows (registered trademark) local folder, and performs the following processing on the files specified by the filename attributes of all of the "config_patterns.patterns.pattern" tags.

The display control part 401 reads the file specified by the filename attribute, obtains the character string of the element of "config_pattern.name" tags, and commands the display part 501 to display the character string as a name representing the user configuration pattern. At this point, the display control part 401 informs the display part 501 of a corresponding filename correlated with the display name.

As a result, when the reception part 502 receives a selected user configuration pattern, the printing condition setting part 505 can obtain the filename of the selected user configuration pattern from the display part 501.

Next, in step S1104, the display control part 401 determines whether the above-described processing has been performed with respect to all of the files specified by the filename attributes of the "config_patterns.patterns.pattern" tags. If the processing has not been performed with respect to all of the files (NO in step S1104), the processing returns to step S1103. If the processing has been performed with respect to all of the files (YES in step S1104), the processing of providing an initial configuration pattern setup ends.

Figure 12:
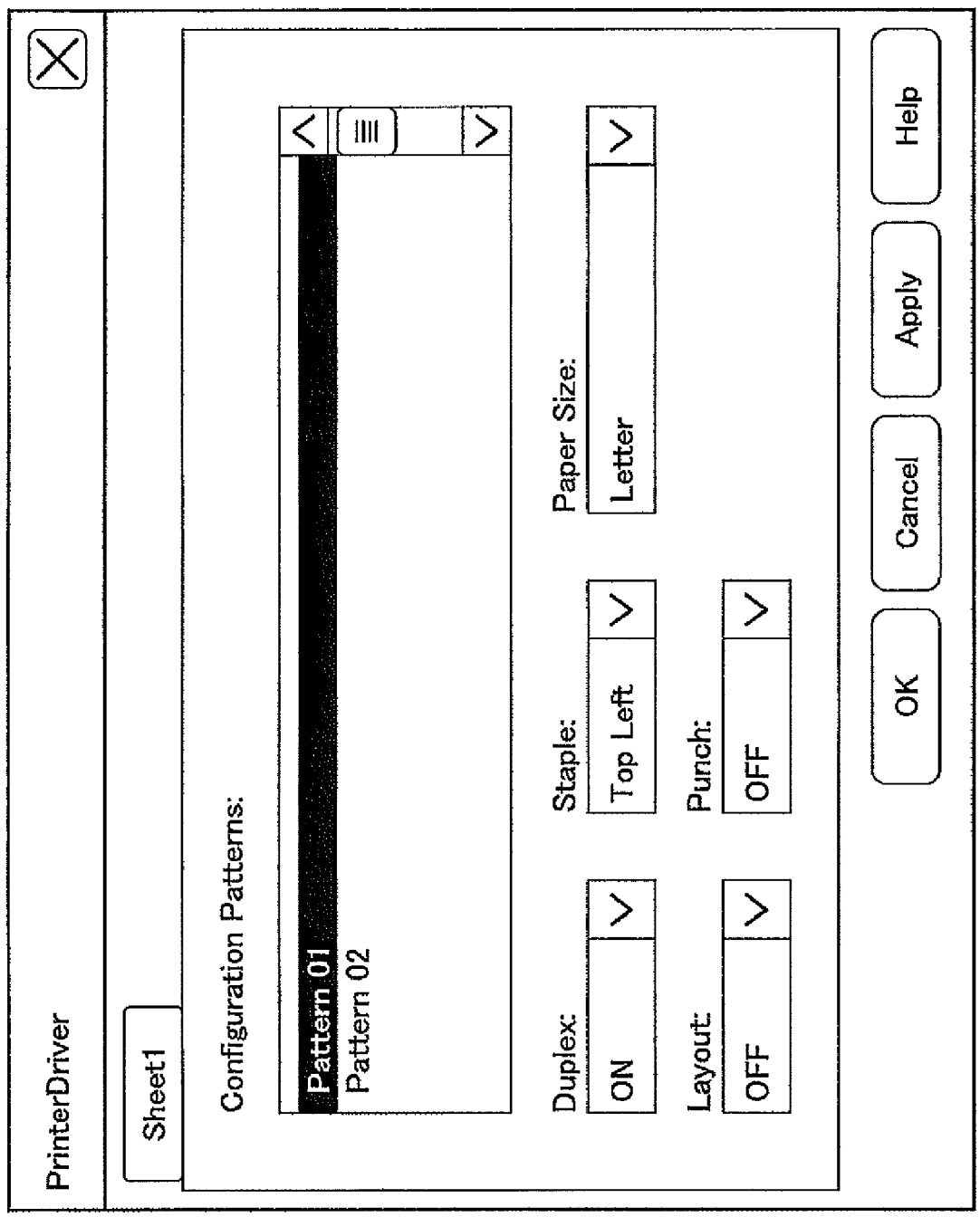
FIG. 12 is a diagram illustrating a display screen where user configuration pattern names are displayed according to the first embodiment of the present invention.

In response to completion of the initial configuration pattern setup processing illustrated in FIG. 11 on the user configuration patterns illustrated in FIG. 7 through FIG. 9, a screen illustrated in FIG. 12 is displayed. FIG. 12 is a diagram illustrating a display screen where user configuration pattern names are displayed.

In the case illustrated in FIG. 12, user configuration pattern names "Pattern 01" and "Pattern 02" are displayed in the display area of "Configuration Patterns:," so that a user can select one of "Pattern 01" and "Pattern 02."

[Changing Printing Condition of Configuration Pattern in First Embodiment]

Figure 13:
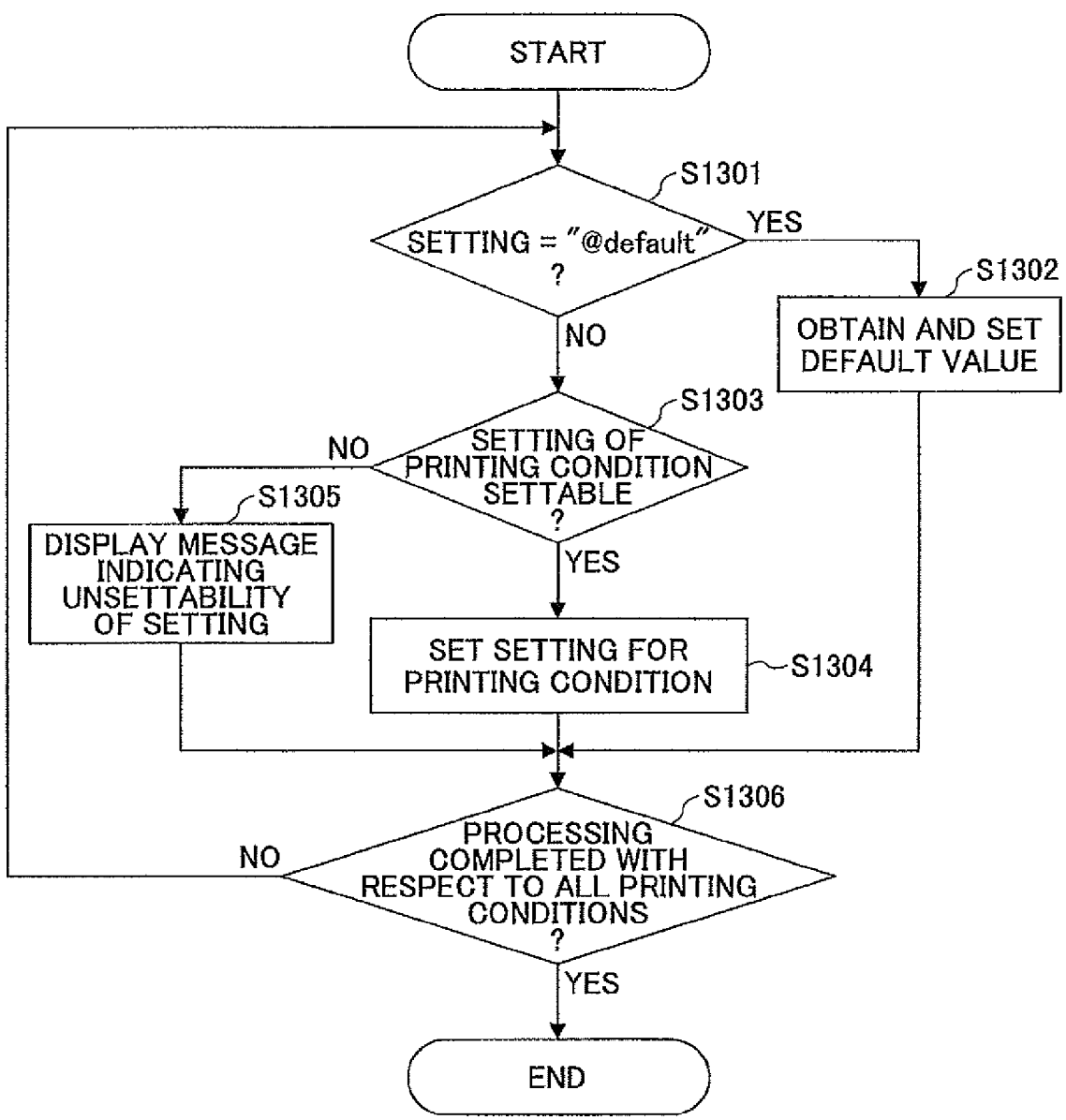
FIG. 13 is a flowchart illustrating changing a printing condition of a user configuration pattern according to the first embodiment of the present invention.

Next, a description is given, with reference to FIG. 13, as well as FIG. 5, of changing a printing condition in the case where one of the user configuration patterns displayed in "Configuration Patterns:" illustrated in FIG. 12 is selected. FIG. 13 is a flowchart illustrating changing a printing condition of a user configuration pattern.

In step S1301, the printing condition setting part 505 determines whether the setting (set value) of a printing condition of the user configuration pattern is "@default." Specifically, the printing condition setting part 505 determines whether the value of a "value attribute" indicating the setting of a printing condition is "@default" as illustrated in FIG. 8 or FIG. 9.

If the determination result of step S1301 is YES, in step S1302, the printing condition setting part 505 obtains the default value of the printing condition from the printer function management part 506, and sets the obtained default value as the value of the printing condition. Specifically, the printing condition setting part 505 obtains the default value of the printing condition in an image forming apparatus to be used using a "name attribute" indicating the name of the printing condition as illustrated in FIG. 7.

If the determination result of step S1301 is NO, in step S1303, the determination part 507 determines whether the value set for the printing condition of the user configuration pattern can be set in an image forming apparatus to be used. Specifically, the determination part 507 determines whether the value of the "value attribute" is settable for the printing condition of the "name attribute" of the image forming apparatus to be used.

If the determination result of step S1303 is YES (settable), in step S1304, the printing condition setting part 505 determines the setting in the user configuration pattern as the value of the printing condition of the image forming apparatus to be used. If the determination result of step S1303 is NO (unsettable), in step S1305, the display part 501 displays a message indicating that the setting of the user configuration pattern is unsettable.

Figure 14:
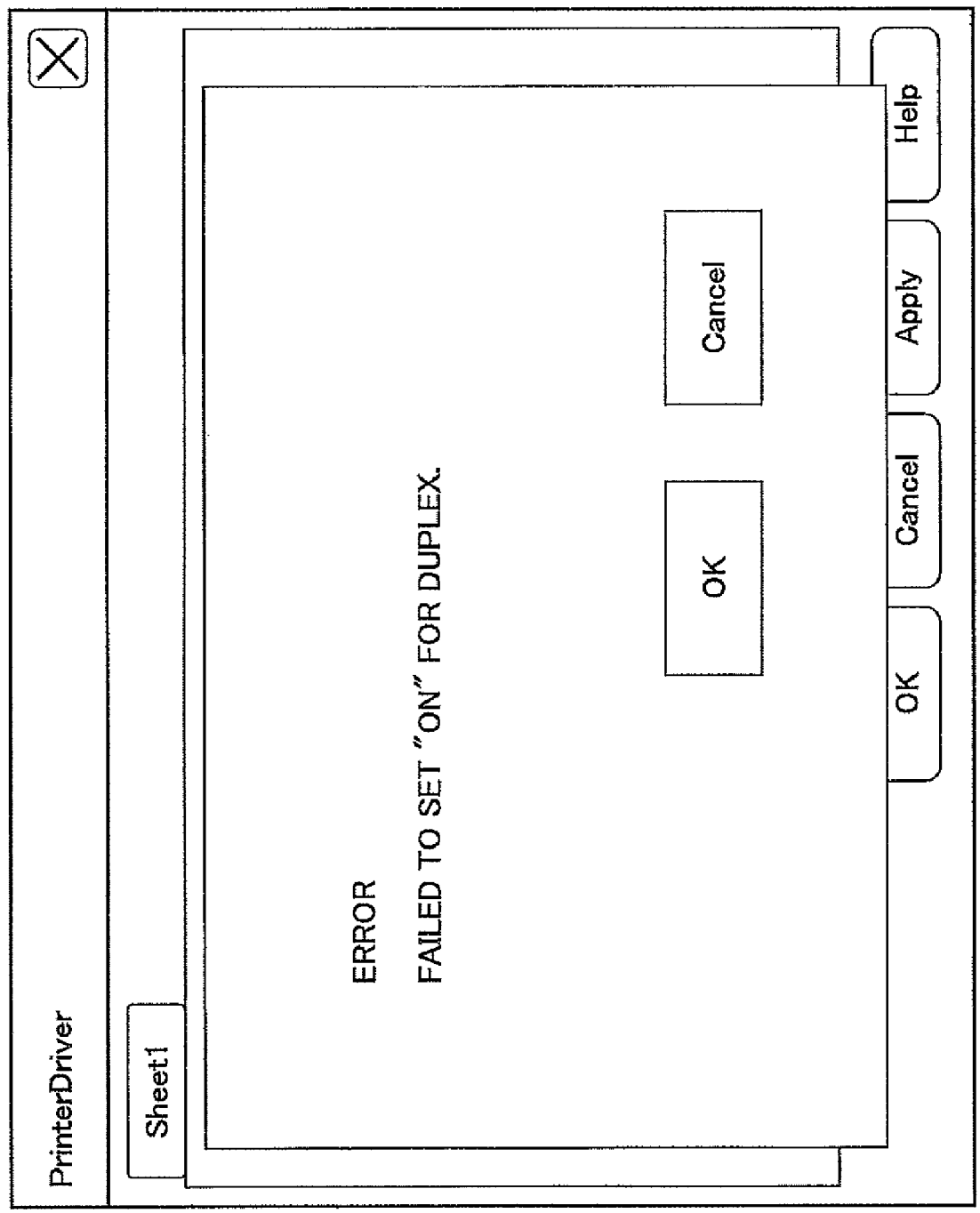
FIG. 14 is a diagram illustrating a display screen that indicates that a setting is unsettable according to the first embodiment of the present invention.

Here, a description is given of a display screen in the processing of step S1305. FIG. 14 is a diagram illustrating a display screen that indicates that the setting is unsettable. For example, if the setting of printing condition "Duplex" of the user configuration pattern is "ON" and the image forming apparatus to be used does not include a duplex unit, the screen illustrated in FIG. 14 is displayed.

Referring back to FIG. 13, if the processing of step S1302, step S1304, or step S1305 ends, in step S1306, the printing condition setting part 505 determines whether the above-described processing has been performed with respect to all of the printing conditions. If the processing has not been performed with respect to all of the printing conditions (NO in step S1306), the processing returns to step S1301. If the processing has been performed with respect to all of the printing conditions (YES in step S1306), the processing of changing a configuration pattern ends. Specifically, the printing condition setting part 505 determines whether the processing has been performed with respect to all of the "config_pattern.settings.feature" tags illustrated in FIG. 8 or FIG. 9.

Here, a description is given, with reference to the following specific example, of how to determine whether to set "@default" indicating a default value or a specific value for a printing condition in storing a user configuration pattern in the first embodiment.

For example, it is assumed that there are the following two types of printers. Printer 1 includes a duplex unit and its default value of printing condition "Duplex" is "ON," and Printer 2 does not have a duplex unit and its default value of printing condition "Duplex" is "OFF." Further, the setting of printing condition "Duplex" is "ON" in "Pattern 01" illustrated in FIG. 8 and "@default" in "Pattern 02" illustrated in FIG. 9. Under these conditions, it is assumed that a user uses Printer 2 as a printer and determines to perform printing with the printing conditions of configuration pattern "Pattern 01." In this case, the setting of printing condition "Duplex" cannot be "ON." Accordingly, the display screen as illustrated in FIG. 14 is displayed to warn the user.

It is assumed that the user determines to perform printing with the printing conditions of user configuration pattern "Pattern 02" under the same conditions as described above. In this case, since the setting of printing condition "Duplex" is "@default," the corresponding default value "OFF" of Printer 2 is obtained from the printer function management part 505 and is set for the printing condition.

That is, some functions may be unusable depending on the image forming apparatus. Therefore, if it is desired to have some information such as a warning presented for an unusable function by the printer driver 206, a specific value may be set for the corresponding printing condition. Further, if it causes no problem to follow a default value without paying particular attention to the value of a printing condition, "@default" may be set.

Thus, the information processor 200 according to the first embodiment makes it possible to configure a common combination of printing conditions that can be used for multiple types of printers in an environment where multiple types of printers are connected.

That is, in the universal driver, it is possible to have a user configuration pattern shared between image forming apparatuses that are different in exclusion specifications.

Further, since some user configuration patterns cannot be set up depending on the image forming apparatus to be used, an unsettable user configuration pattern may be selected by a user. In such a case, however, it is possible to inform the user of the unavailability of the selected user configuration pattern by issuing a warning.

Second Embodiment

According to a second embodiment of the present invention, a configuration pattern may be stored (described) in the information processor 200 with the description of "@default" setting as illustrated in FIG. 8 or FIG. 9 being omitted. FIG. 15 and FIG. 16 are diagrams each illustrating a description of a user configuration pattern according to the second embodiment.

FIG. 15 represents the same configuration pattern as that illustrated in FIG. 8, and FIG. 16 represents the same user configuration pattern as that illustrated in FIG. 9. The same description format as in FIG. 7 is also used in the second embodiment.

In the description of the user configuration pattern illustrated in FIG. 15, the description of printing conditions whose settings are "@default" in FIG. 8, that is, printing conditions "Layout," "Punch," and "Paper Size," is omitted. Likewise, in the description of the user configuration pattern illustrated in FIG. 16, the description of printing conditions "Layout," "Punch," and "Paper Size" illustrated in FIG. 9 is omitted.

[Changing Printing Condition of User Configuration Pattern in Second Embodiment]

Figure 17:
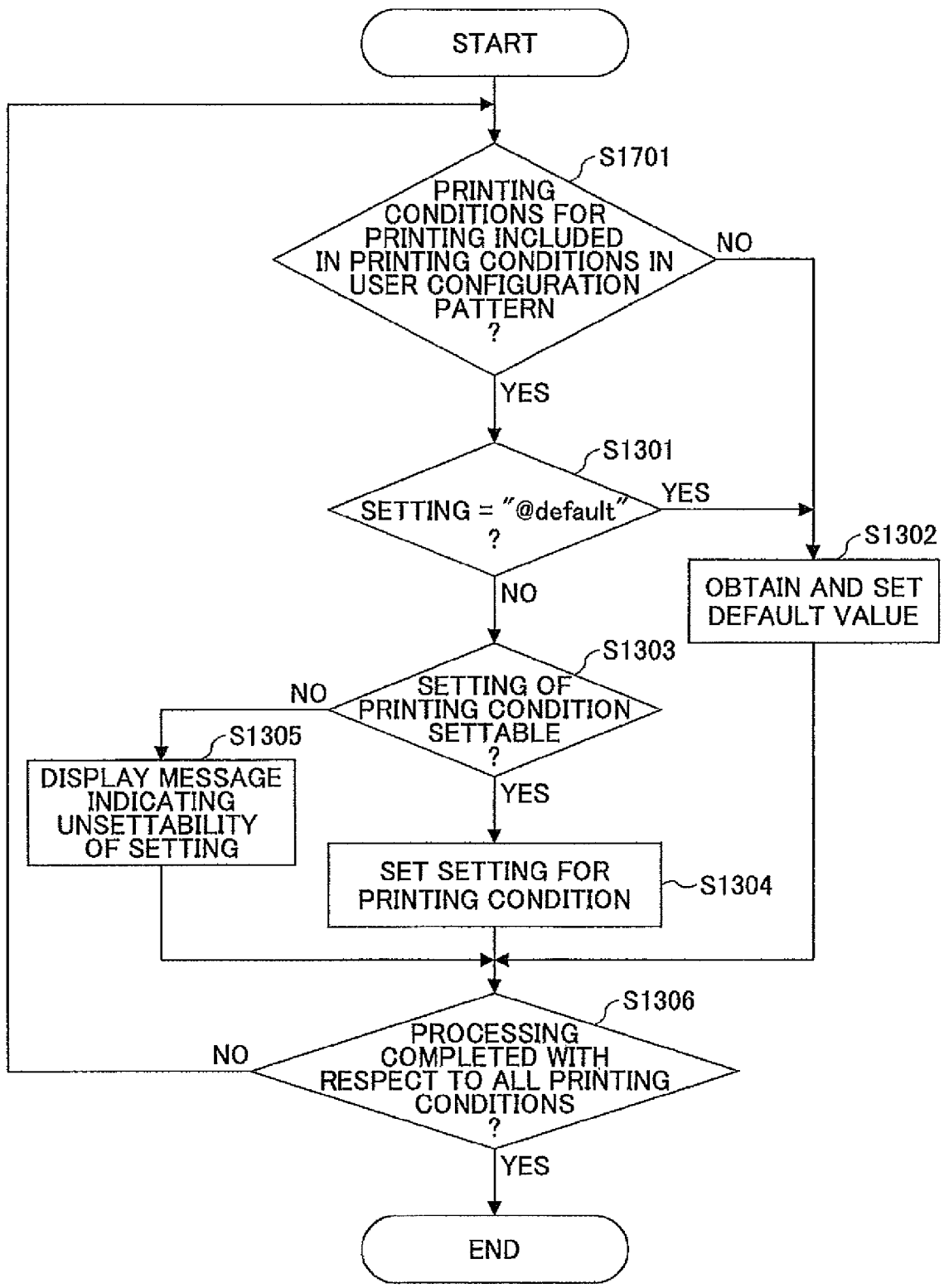
FIG. 17 is a flowchart for illustrating changing a printing condition of the user configuration pattern according to the second embodiment of the present invention.

A description is given, with reference to FIG. 17, as well as FIG. 5, of changing a printing condition of a user configuration pattern according to the second embodiment. The contents of processing in the second embodiment are different from those in the first embodiment because a description of some printing conditions is omitted in the user configuration pattern in the second embodiment.

FIG. 17 is a flowchart for illustrating changing a printing condition of a user configuration pattern according to the second embodiment. In FIG. 17, the same processing as that in FIG. 13 is referred to by the same step number as in FIG. 13, and a description thereof is omitted.

In step S1701, the printing condition setting part 505 determines whether each of the printing conditions necessary for printing contained in the configuration pattern storage part 504 is included in the printing conditions of the user configuration pattern. Specifically, the printing condition setting part 505 determines whether each of the printing conditions of the "config_patterns.features.feature" tags illustrated in FIG. 7 is included in the printing conditions of the "config_pattern.settings.feature" tags of "config_patterns.xml" (FIG. 15 or FIG. 16).

If the determination result of step S1701 is NO, in step S1302, the same processing as illustrated in FIG. 13 is performed. If the determination result of step S1701 is YES, in step S1301, the same processing as illustrated in FIG. 13 is performed.

That is, according to the second embodiment, a default value of the image forming apparatus is set for a printing condition if the setting of the printing condition is "@default" or if the printing condition is necessary for printing but is not described (contained) in the user configuration pattern.

Thus, the information processor 200 according to the second embodiment makes it possible to configure a common combination of printing conditions that can be used for multiple types of printers in an environment where multiple types of printers are connected even if user configuration patterns are described in a manner different from that of the first embodiment.

Third Embodiment

According to a third embodiment of the present invention, the information processor 200 provides an initial configuration pattern setup different from that described in the first embodiment. Specifically, at the time of providing an initial configuration pattern setup, it is determined whether it is possible to set the setting of a printing condition of a user configuration pattern, and a user configuration pattern that includes a setting that cannot be set in an image forming apparatus to be used is not displayed in the display part 501.

[Initial Configuration Pattern Setup in Third Embodiment]

Figure 18:
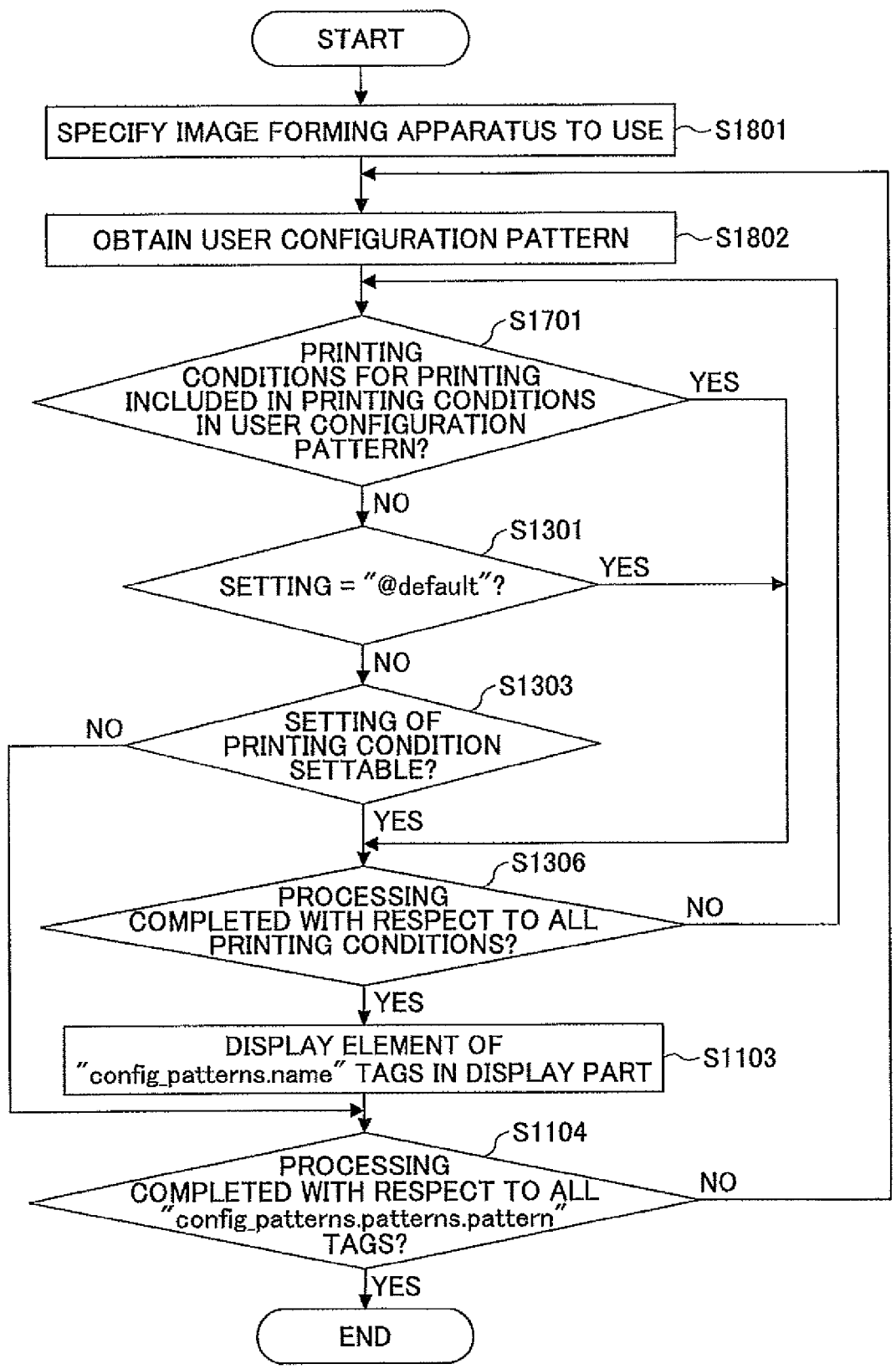
FIG. 18 is a flowchart for illustrating an initial configuration pattern setup according to a third embodiment of the present invention.

FIG. 18 is a flowchart for illustrating an initial configuration pattern setup according to the third embodiment. In the processing illustrated in FIG. 18, the same processing as that performed in FIG. 11, FIG. 13, or FIG. 17 is referred to by the same step number as in FIG. 11, FIG. 13, or FIG. 17, and a description thereof is omitted.

In step S1801, multiple image forming apparatuses are displayed by the display part 501 so as to prompt a user to select one of the image forming apparatus to use. The reception part 502 receives the selected one of the image forming apparatuses, and informs the printing condition setting part 505 of the selected one of the image forming apparatuses.

Next, in step S1802, the printing condition setting part 505 obtains a user configuration pattern from the configuration pattern storage part 504.

Next, the printing condition setting part 505 performs the same processing as in step S1701 on the obtained user configuration pattern. Thereafter, the same processing as described above is performed.

Here, a description is given of a flow of processing according to the initial configuration pattern setup of the third embodiment. If the printing condition setting part 505 determines that a specific value is set as the setting of a printing condition of the configuration pattern in step S1301, the processing proceeds to step S1303.

Then, if the determination part determines that the setting of the user configuration pattern is unsettable for the image forming apparatus to be used in step S1303, the processing skips step S1103 and proceeds to step S1104.

That is, by skipping step S1103, a user configuration pattern having an unsettable setting is prevented from being displayed in the display part 501.

Next, a specific description is given, using the configuration patterns illustrated in FIG. 8 and FIG. 9, of the initial configuration pattern setup in the third embodiment. Here, it is assumed that the user selects an image forming apparatus having no duplex unit (above-described Printer 2) in step S1801.

In this case, the setting of printing condition "Duplex" is "ON" in "Pattern 01" illustrated in FIG. 8, but cannot be "ON" in Printer 2. (This is determined in step S1303.)

At this point, it is possible to notify the user of the unsettability by displaying a warning screen or making sounds for giving an audio warning. A description is given, with reference to FIG. 19, of displaying an error screen.

Figure 19:
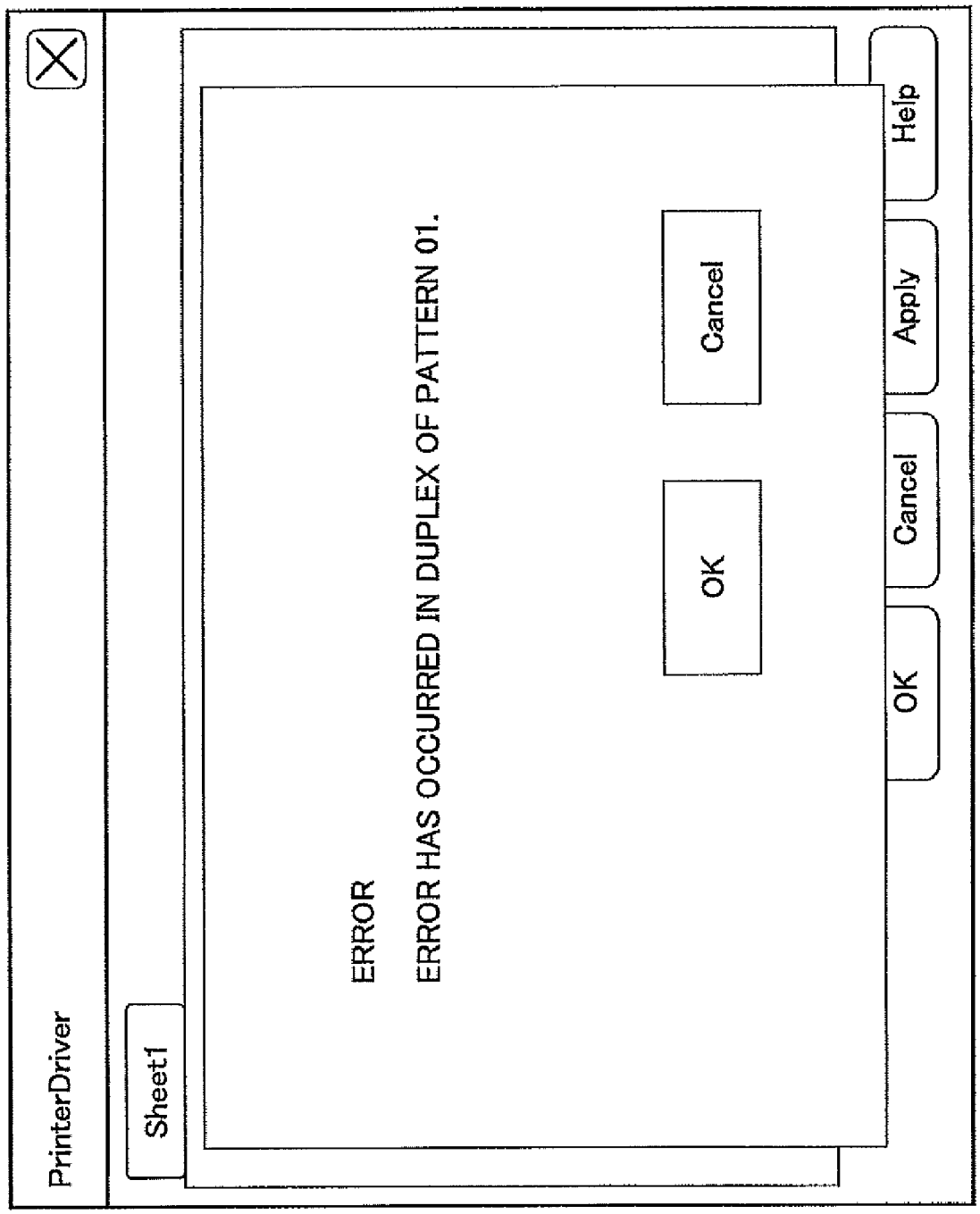
FIG. 19 is a diagram illustrating a display screen that displays an error message according to the third embodiment of the present invention.

FIG. 19 is a diagram illustrating a display screen that displays an error message. The display screen of FIG. 19 is different from that of FIG. 14 in that a user configuration pattern in which an error has occurred is displayed (indicated). This allows a user to be informed with respect to which printing condition of which user configuration pattern an error has occurred before configuring printing conditions.

As described above, if an error has occurred, step S1103 is skipped, that is, "Pattern 01" is not displayed in the display part 501, and the processing illustrated in FIG. 18 is performed on "Pattern 02." Finally, "Pattern 02" illustrated in FIG. 9 is displayed in the display part 501.

Figure 20:
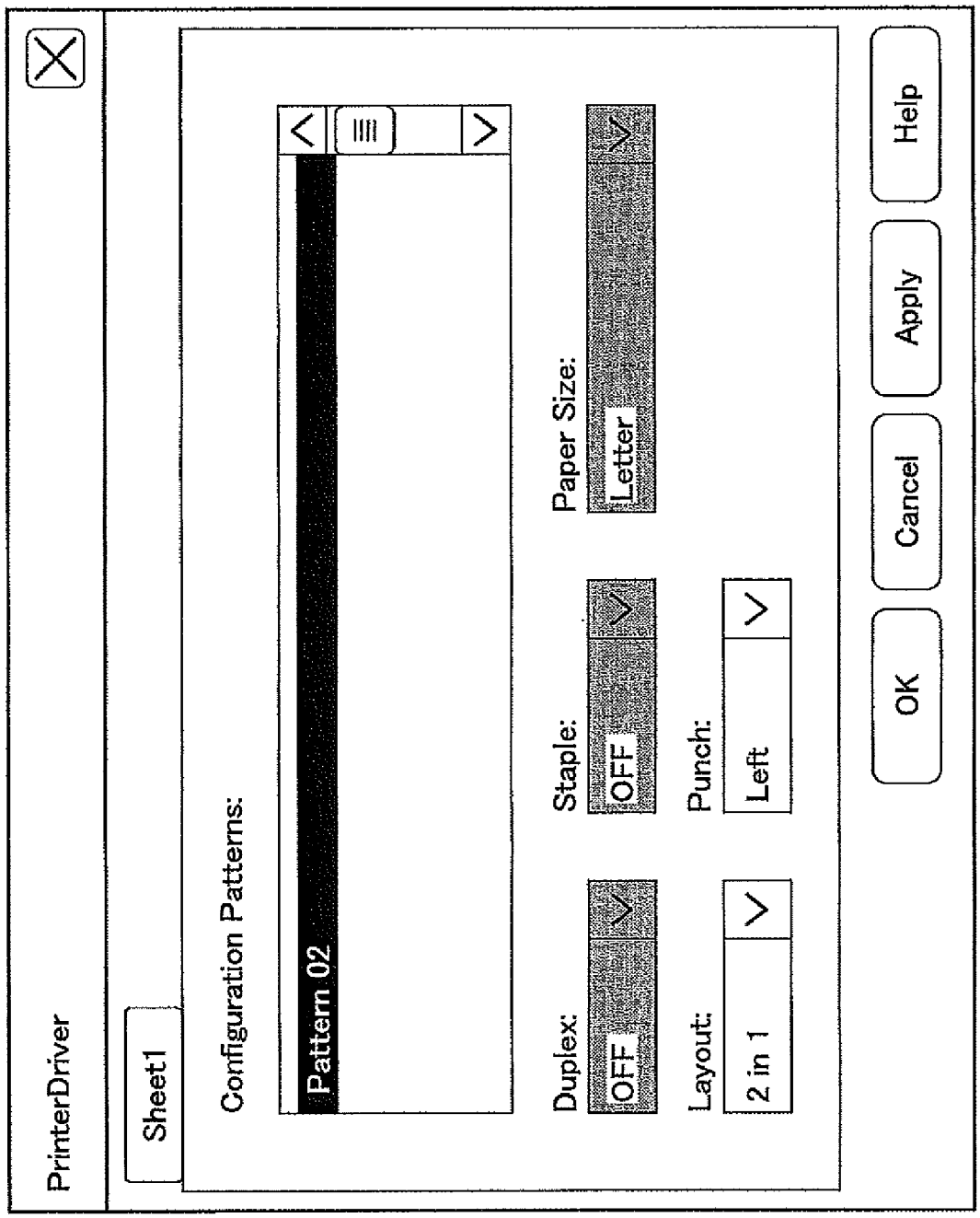
FIG. 20 is a diagram illustrating a display screen where a user configuration pattern name is displayed according to the third embodiment of the present invention.

FIG. 20 is a diagram illustrating a display screen where "Pattern 02" is displayed. The display screen of FIG. 20 is different from that of FIG. 12 in that "Pattern 01" is not displayed in the display area of "Configuration Patterns:." Further, the printing conditions for which specific settings are set ("Layout" and "Punch") and the printing conditions for which default values are set ("Duplex," "Staple," and "Paper Size") are visually distinguishable from each other. Specifically, the former and the latter may be made visually distinguishable by using different colors for characters between them or shading the boxes of one of the former and the latter.

Thus, according to the third embodiment, by determining whether the setting of a printing condition of a user configuration pattern is settable for an image forming apparatus to be used at the stage of providing an initial configuration pattern setup, the information processor 200 can prevent a user configuration pattern that cannot be used in an image forming apparatus specified by a user from being displayed on the display screen.

According to the third embodiment, after specifying an image forming apparatus, a user configuration pattern that can be used for the specified image forming apparatus is displayed. Alternatively, after specifying a user configuration pattern, an image forming apparatus that can be used with respect to the specified user configuration pattern may be displayed. At this point, an image forming apparatus for which each of the settings of the printing conditions included in the specified user configuration pattern is settable is displayed on the display screen.

Further, according to the third embodiment, an image forming apparatus may not necessarily be specified first, and a usable image forming apparatus may be determined by the processing illustrated in FIG. 18 and displayed for each user configuration pattern. This allows a user to select both a configuration pattern and an image forming apparatus that the user desires to use, so that the user can perform printing in a more desirable manner.

Fourth Embodiment

According to a fourth embodiment of the present invention, the information processor 200 can prevent incompatible settings from being provided simultaneously by determining the incompatibility between a default value obtained with "@default" and a specific setting (specifically set value).

FIG. 21 is a diagram illustrating a user configuration pattern that provides (sets) incompatible settings simultaneously. As illustrated in FIG. 21, "Staple" is set to "@default" and "Punch" is set to "right" in "Pattern 03."

At this point, it is assumed that the default value of "Staple" is, for example, "left." In this case, configuring print settings using the user configuration pattern illustrated in FIG. 21 results in printouts with stapling on the left side and punched holes on the right side, which are supposed to be prevented or prohibited from occurring simultaneously. Therefore, according to the fourth embodiment, the printer function management part 506 determines the incompatibility between a default value obtained with "@default" and a specific setting in order to solve such a problem.

Figure 22:
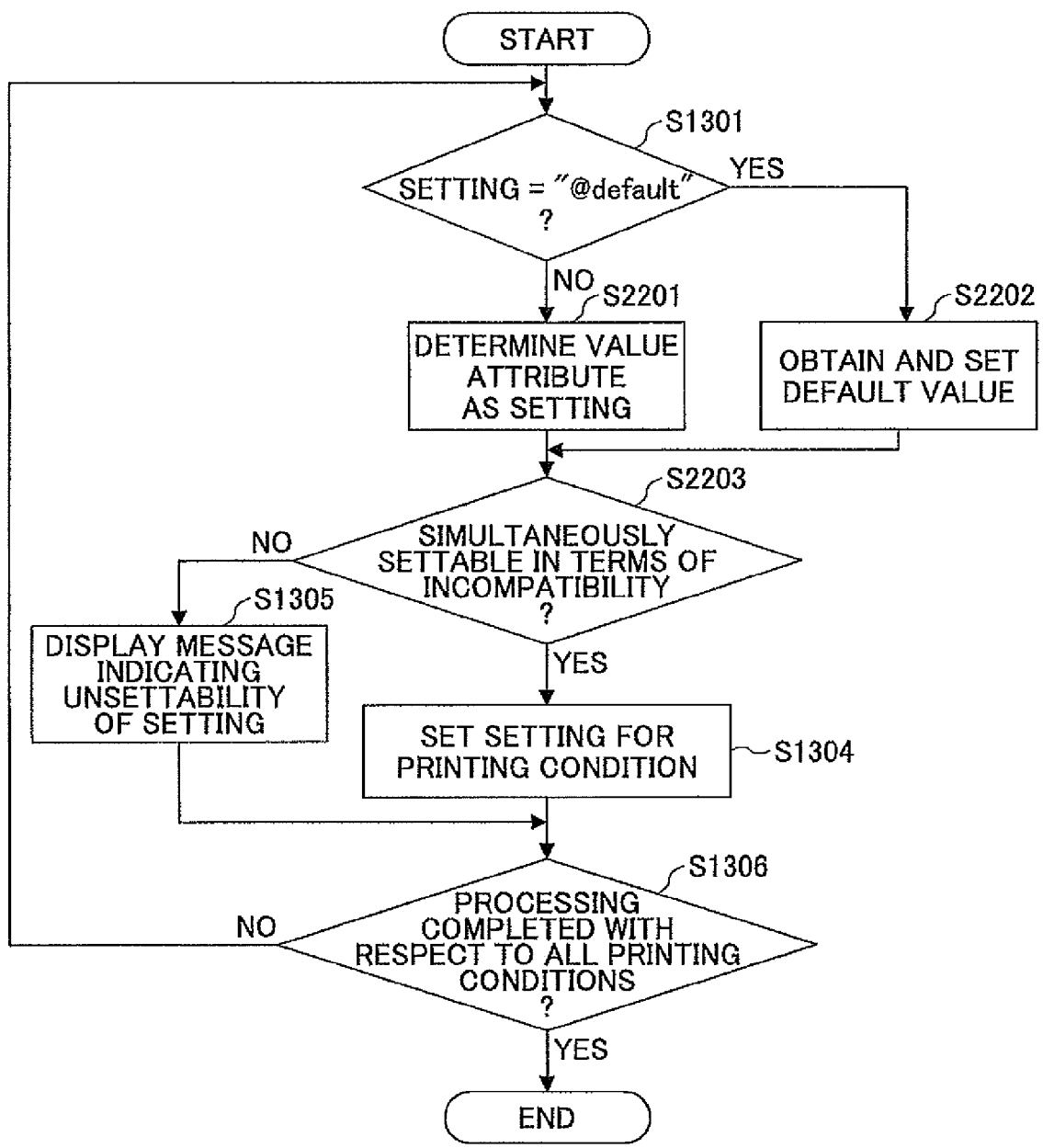
FIG. 22 is a flowchart for illustrating a first operation of changing a printing condition of the user configuration pattern according to the fourth embodiment of the present invention.

FIG. 22 is a flowchart for illustrating a first operation of changing a printing condition of a user configuration pattern according to the fourth embodiment. In the processing illustrated in FIG. 22, the same processing as that performed in FIG. 13 is referred to by the same step number as in FIG. 13, and a description thereof is omitted.

In step S1301, the printing condition setting part 505 determines whether the setting of a printing condition of a user configuration pattern is "@default." If the determination result of step S1301 is YES, in step S2202, the printing condition setting part 505 obtains the default value of the printing condition from the printer function management part 506, and sets the obtained default value for the printing condition.

If the determination result of step S1301 is NO, in step S2201, the printing condition setting part 505 determines the value of the "value attribute" set in the printing condition of the user configuration pattern as the setting of the printing condition.

In step S2203 subsequent to step S2201 or step S2202, the printing condition setting part 505 queries the printer function management part 506 about the incompatibility between the settings of the printing conditions. The printer function management part 506 determines whether the settings provided for the printing conditions are compatible with each other (settable simultaneously). The printer function management part 506 retains incompatibility information indicating printing condition settings that cannot be set (provided) simultaneously in the image forming apparatus. Alternatively, the incompatibility information may be contained in another storage part and be referred to by the printing function management part 506.

If the determination result of step S2203 is YES (simultaneously settable), the processing proceeds to step S1304, and if the determination result of step S2203 is NO (simultaneously unsettable), the processing proceeds to step S1305.

Figure 23:
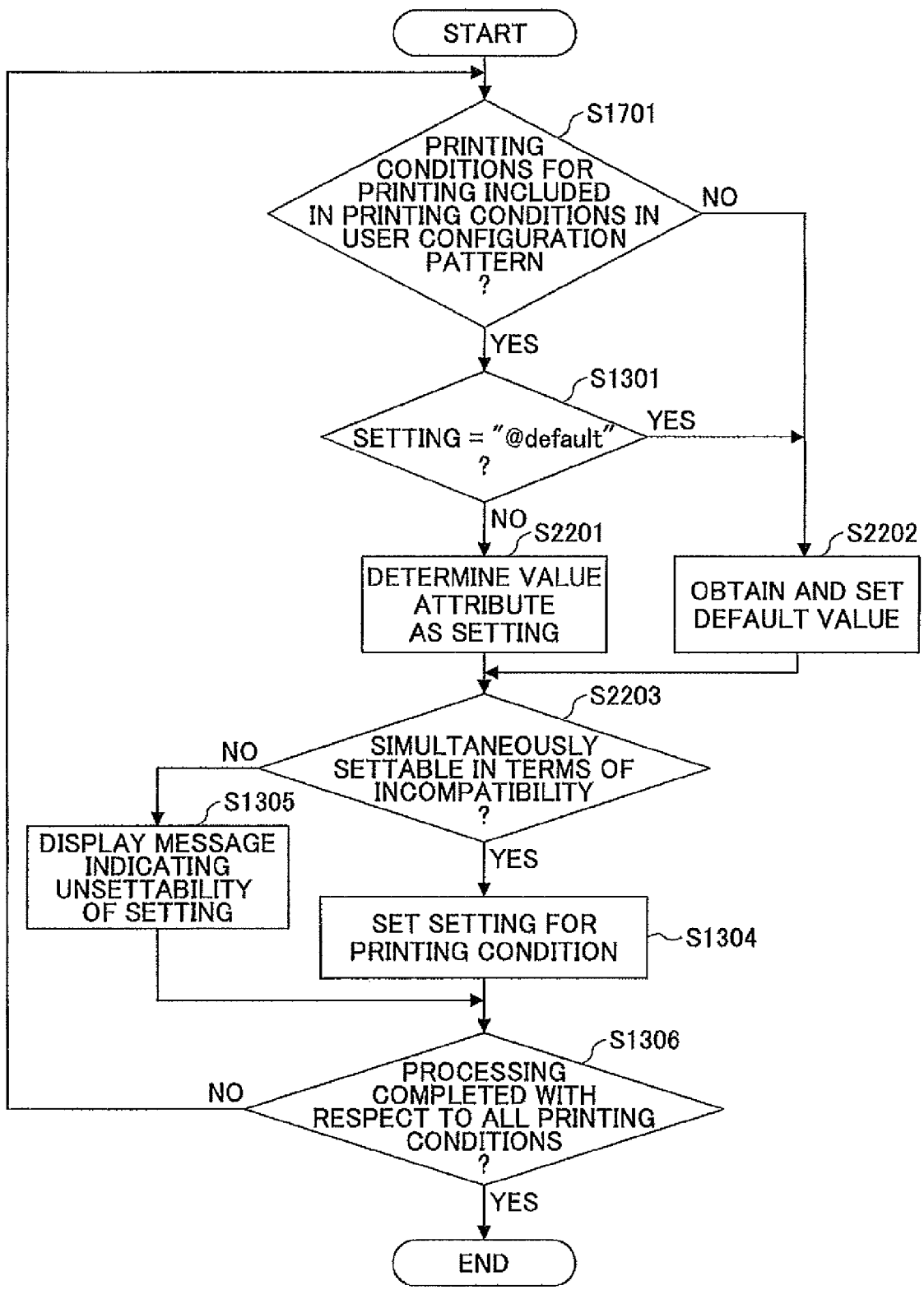
FIG. 23 is a flowchart for illustrating a second operation of changing a printing condition of the user configuration pattern according to the fourth embodiment of the present invention.

Further, the same applies to the changing of a user configuration pattern described in the second embodiment. FIG. 23 is a flowchart for illustrating a second operation of changing a printing condition of a user configuration pattern according to the fourth embodiment. In the processing illustrated in FIG. 23, the same processing as that performed in FIG. 17 or FIG. 21 is referred to by the same step number as in FIG. 17 or FIG. 21, and a description thereof is omitted. That is, if the determination result in step S1701 is NO or if the determination result of step S1301 is YES, the processing of step S2202 is performed. If the determination result of step S1301 is NO, the processing of step S2201 is performed. After step S2201 or step S2202, the processing of step S2203 is performed. As illustrated in FIG. 23, it is possible to determine incompatibility in the changing processing in the second embodiment as well.

Thus, according to the fourth embodiment, the information processor 200 can prevent incompatible settings from being set simultaneously by determining the incompatibility between a default value obtained with "@default" and a specific setting (specifically set value).

Fifth Embodiment

Figure 24:
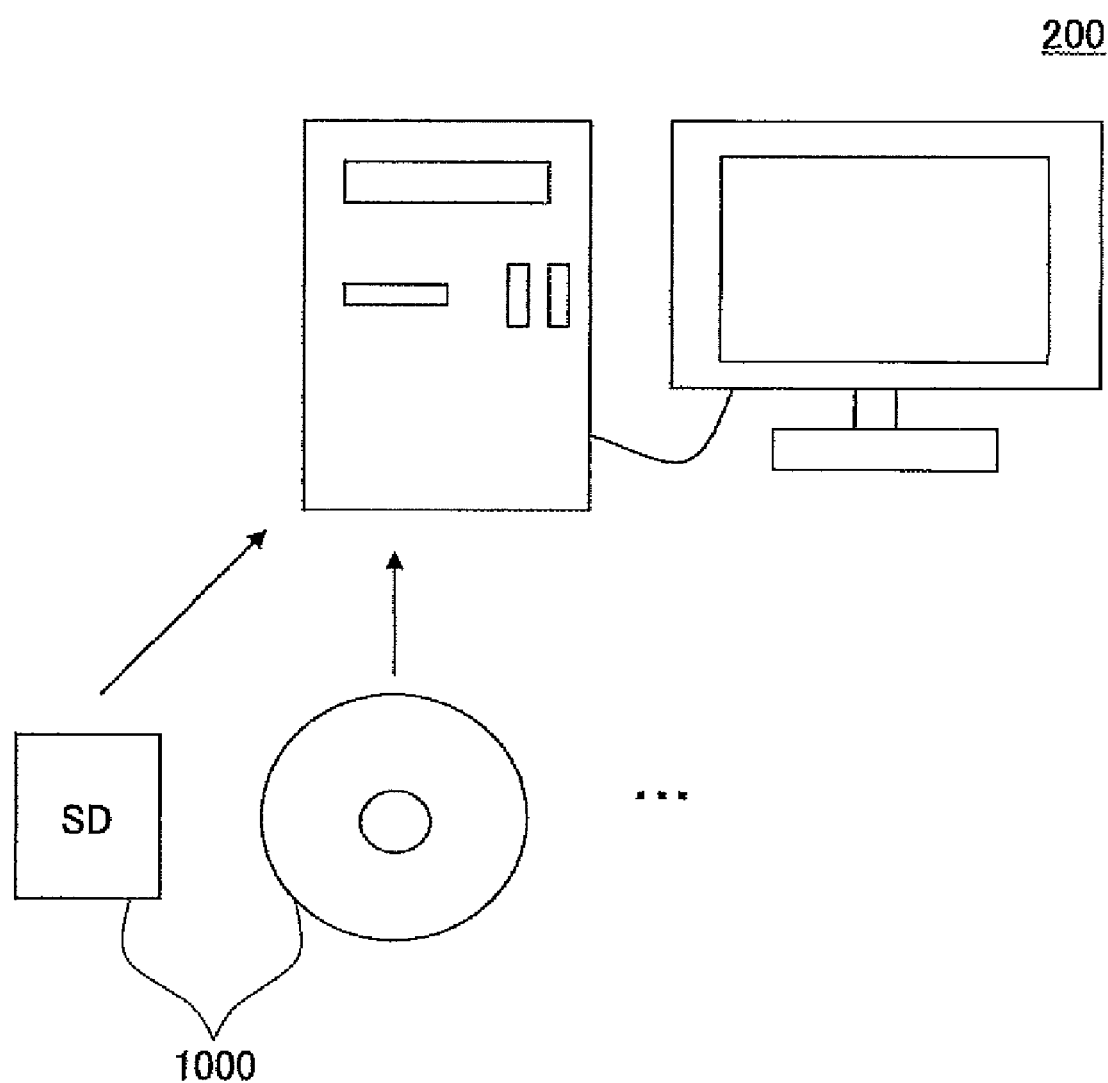
FIG. 24 is a diagram illustrating an application of the present invention according to a fifth embodiment of the present invention.

FIG. 24 is a diagram illustrating an application of the present invention according to a fifth embodiment. The program that causes a computer to execute the above-described processing may be recorded in an external recording medium 1000. Examples of the recording medium 1000 include optical, magnetic, or electric recording media such as SD cards, CD-ROMs, DVD-ROMs, and MOs. In this case, the program of the recording medium 1000 may be loaded into, for example, a memory such as a RAM through a drive unit (not graphically illustrated) in the information processor 200 to be read and executed.

According to one aspect of the present invention, it is possible to configure a combination of printing conditions shared by multiple types of printers in an environment where multiple types of printers are connected.

The present invention is not limited to the specifically disclosed embodiments, and variations and modifications may be made without departing from the scope of the present invention.

The present application is based on Japanese Priority Patent Applications No. 2008-100512, filed on Apr. 8, 2008, and No. 2009-037032, filed on Feb. 19, 2009, the entire contents of which are incorporated herein by reference.

What is claimed is:

1. An information processor, comprising:
a display part configured to display a configuration pattern combining a plurality of values set for corresponding two or more of printing conditions;
a management part configured to manage a plurality of default values for the printing conditions for an image forming apparatus;
a recording part configured to record the configuration pattern, the recording part being configured to optionally set an identifier as a value for the individual printing conditions, the identifier being indicative of the individual default values; and
a setting part configured to, in response to the identifier being set for at least one of the two or more of the printing conditions in the configuration pattern recorded by the recording part, obtain one of the default values corresponding to the at least one of the two or more of the printing conditions from the management part and set the obtained one of the default values for the at least one of the two or more of the printing conditions in the configuration pattern,
wherein the management part includes a determination part configured to determine whether the values set for the two or more of the printing conditions in the configuration pattern are settable for printing,
the setting part is configured to, with respect to one of the values determined as unsettable by the determination part, prevent the one of the values from being set for the printing, and
the determination part is configured to further determine whether the one of the default values set for the at least one of the two or more of the printing conditions and the values set for the remaining one or more printing conditions in the configuration pattern are settable simultaneously.

2. The information processor as claimed in claim 1, wherein the setting part is configured to, in response to one of the printing conditions not being included in the two or more of the printing conditions in the configuration pattern, obtain one of the default values corresponding to the one of the printing conditions from the management part and set the obtained one of the default values for the one of the printing conditions.

3. The information processor as claimed in claim 1, wherein the display part is configured to display information indicating an unsettability of the one of the values in response to the determination part determining the unsettability of the one of the values.

4. An information processor, comprising:
a display part configured to display a configuration pattern combining a plurality of values set for corresponding two or more of printing conditions;
a management part configured to manage a plurality of default values for the printing conditions for an image forming apparatus;
a recording part configured to record the configuration pattern, the recording part being configured to optionally set an identifier as a value for the individual printing conditions, the identifier being indicative of the individual default values; and
a setting part configured to, in response to the identifier being set for at least one of the two or more of the printing conditions in the configuration pattern recorded by the recording part, obtain one of the default values corresponding to the at least one of the two or more of the printing conditions from the management part and set the obtained one of the default values for the at least one of the two or more of the printing conditions in the configuration pattern,
wherein the management part includes a determination part configured to determine whether the values set for the two or more of the printing conditions in the configuration pattern are settable for printing,
the display part is configured to prevent the configuration pattern from being displayed in response to the determination part determining that one of the values is unsettable for the printing, and
the determination part is configured to further determine whether the one of the default values set for the at least one of the two or more of the printing conditions and the values set for the remaining one or more printing conditions in the configuration pattern are settable simultaneously.

5. An information processing method, comprising the steps of:
(a) displaying a configuration pattern combining a plurality of values set for a plurality of printing conditions;
(b) recording the configuration pattern;
(c) determining, with respect to each of the printing conditions in the recorded configuration pattern, whether an identifier indicating a default value for the printing condition is set for the printing condition; and
(d) obtaining the default value from a storage part and setting the default value for the printing condition in response to said step (c) determining that the identifier indicating the default value for the printing condition is set for the printing condition,
wherein it is determined whether the values set for the printing conditions in the configuration pattern are settable for printing,
one of the values determined as unsettable is prevented from being set for the printing, and
it is determined whether the default value set for one of the printing conditions and the values set for the remaining one or more printing conditions in the configuration pattern are settable simultaneously.

6. A non-transitory computer-readable recording medium having a program for causing a computer to execute the information processing method as set forth in claim 5 recorded therein.

* * * * *